Nov. 18, 1952  C. L. BISHOP  2,618,489
TRAILER HITCH BALL COVER
Filed July 18, 1951  2 SHEETS—SHEET 1
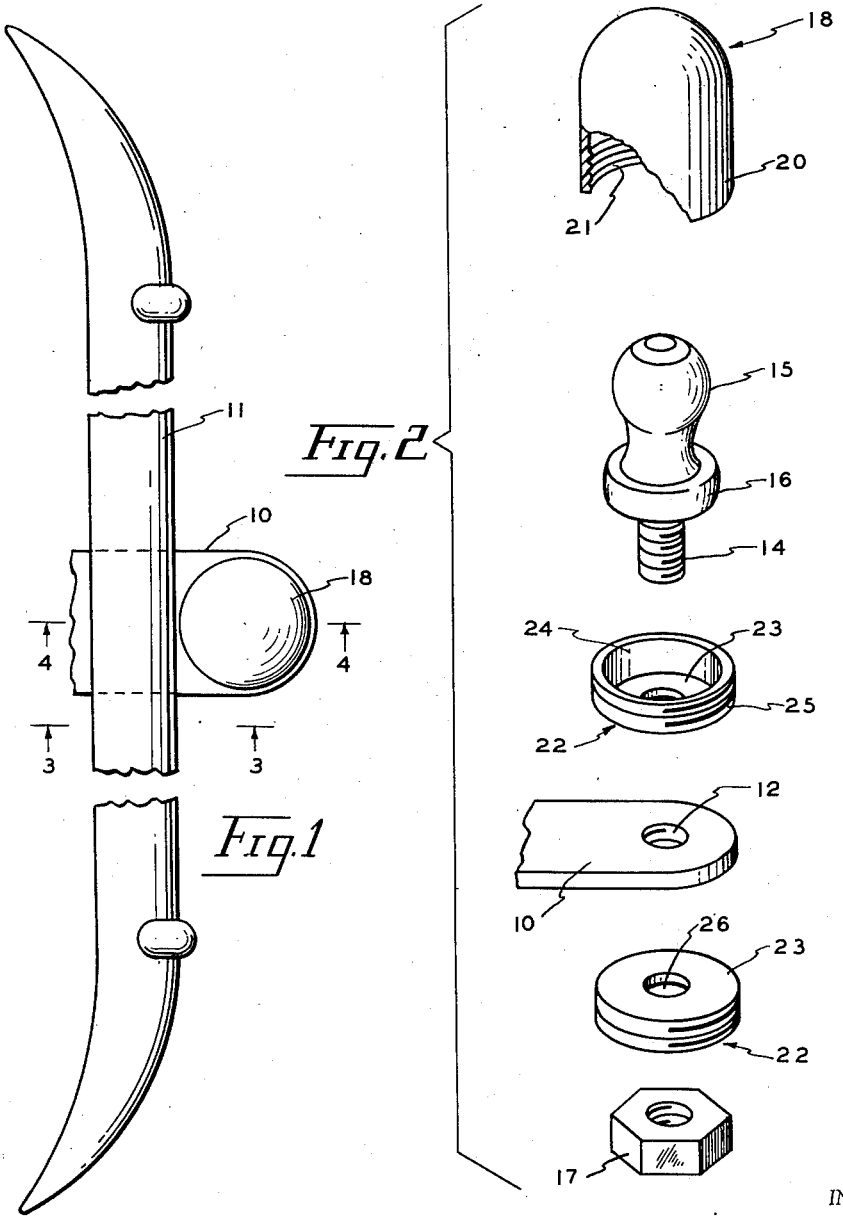
INVENTOR
CLAIR L. BISHOP
BY Gustave Miller
ATTORNEY Nov. 18, 1952     C. L. BISHOP     2,618,489
TRAILER HITCH BALL COVER Filed July 18, 1951     2 SHEETS—SHEET 2

INVENTOR
CLAIR L. BISHOP

BY *Gustave Miller*
ATTORNEY

Patented Nov. 18, 1952

2,618,489

UNITED STATES PATENT OFFICE 2,618,489

TRAILER HITCH BALL COVER

Clair L. Bishop, Kennewick, Wash.

Application July 18, 1951, Serial No. 237,426

1 Claim. (Cl. 280—33.17)

This invention relates to a trailer hitch ball cover and has for an object to provide a cover means for a trailer hitch ball particularly intended for use in connection with passenger vehicles wherein the trailer hitch ball is usually located on the trailer hitch drawbar extending just under the rear bumper of the passenger car, and subject as a result of use to being either rusty or greasy or otherwise dirty with the attendant liability of soiling one's clothes when opening the rear trunk of the automobile while using the automobile without a trailer connected thereto. A trailer is often parked for a long period of time between the times it is hitched to the towing automobile, and it is customary to permanently attach the trailer hitch drawbar and hitch ball to the automobile even though it is only used occasionally for drawing the trailer. As a result the hitch ball will usually be greasy if the trailer has been recently disconnected therefrom or if the grease has been rubbed away it often gets rusty or otherwise soiled. When one opens the trunk, he is very apt to lean over the trailer hitch ball and soil his clothing against the rusty, greasy or dirty hitch ball. Furthermore, by having the greasy hitch ball exposed to the weather, the grease will often be rubbed off or otherwise become removed therefrom, and the hitch ball will rust and deteriorate.

It is an object of this invention to provide a cover means for the hitch ball of a trailer hitch drawbar which can be used to cover and protect the greasy hitch ball against the ball becoming rusty and at the same time protect the clothing of one opening the trunk or otherwise brushing against the hitch ball from becoming either greasy or rusty.

A further object of this invention is to provide a trailer hitch ball cover and an adapter which may be added to and secured by the shank of the hitch ball for the cover to be secured thereon, if the hitch ball base is not itself already arranged for mounting the cover thereon.

A further object of this invention is to provide an adapter to cooperate with the hitch ball cover for holding the hitch ball cover in position either on the hitch ball when the same is not used in trailer towing operation, and also may be used for storing the cover thereon by securing the adapter to the bottom of the hitch ball shank below the drawbar so that the hitch ball cover will be kept in convenient position ready to be put in hitch ball covering and protecting position as soon as the trailer is disconnected from the hitch ball.

A further object of this invention is to provide a hitch ball cover which may be mounted on the base of a trailer hitch ball, if the base has been arranged to receive the cover, or otherwise may be mounted on an adapter which is placed about the shank of the hitch ball and secured between the base of the hitch ball and the drawbar.

With the foregoing and other objects in view, this invention comprises the combination, construction and arrangement of parts hereinafter set forth, claimed and disclosed in the accompanying drawings, wherein:

Fig. 1 is a partly broken away top plan view showing the hitch ball cover in operative position.

Fig. 2 is an exploded perspective view of the entire assembly.

Figure 3:
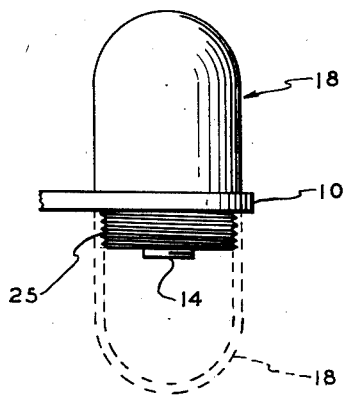
Fig. 3 is a view on line 3—3 of Fig. 1.

There is shown at 10 a trailer hitch drawbar extending beneath the bumper 11 of the automobile to which it is secured, the drawbar 10 having a threaded opening 12 for threadedly receiving the threaded shank 14 of a conventional trailer hitch ball 15 provided with its usual base 16. Ordinarily the hitch ball 15 is secured to the drawbar 10 by having its threaded shank 14 secured through the threaded opening 12 of drawbar 10 as far as the hitch ball base 16. To further secure the hitch ball 15 in place on the drawbar 10, a nut 17 may be secured on the shank 14 below the drawbar 10.

The hitch ball cover 18 of this invention consists of a cup shaped or thimble shaped member having an internal size slightly larger than the external diameter of the hitch ball 15 and having sides 20 of sufficient depth to extend down over the hitch ball 15 and its base 16. The lower inner surface of the sides 20 of the hitch ball cover 18 is provided with threads 21. While the base 16 of hitch ball 15 may be made of a suitable diameter and with a complementary thread to receive the thread 21 of the cover 18, it is preferable and also necessary in the case of already existing hitch balls to provide an adapter on which the threads 21 of the cover 18 are secured. Such an adapter is shown at 22 and consists of a disk member 23 provided with an upstanding flange 24 which is externally threaded at 25 complementary to the internal thread 21 of the cover 18. The internal diameter of the upstanding flange 24 is of course greater than the base 16 of the ball 15, for the diameter of the base 16 in most existing hitch balls is usually less than the diameter of the hitch ball 15 thus necessitating the use of an adapter. The disk 23 of the adapter 22 is provided with an aperture 26 of a size to fit over the threaded shank 14 and may be correspondingly threaded if desired although such is not essential.

Figure 4:
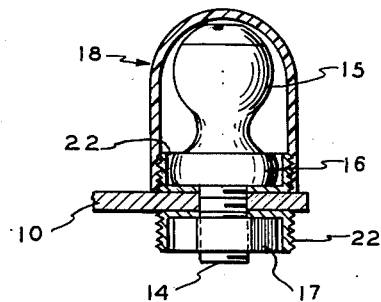
Fig. 4 is a sectional view on line 4—4 of Fig. 1.
Figure 5:
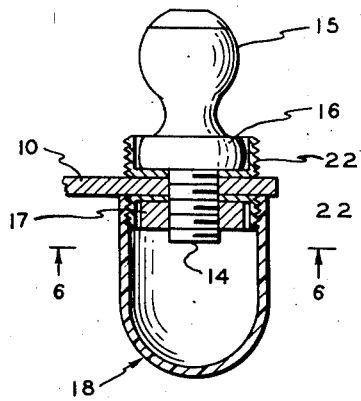
Fig. 5 is a partly sectional view showing the hitch ball cover in stored position on an adapter at the bottom of the hitch ball shank.
Figure 6:
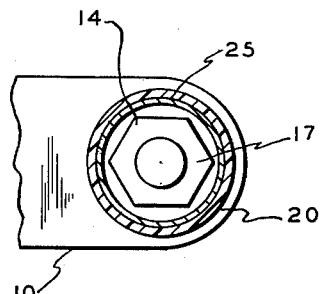
Fig. 6 is a sectional view on line 6—6 of Fig. 5.

In operation, it is preferred to use two adapters 22, mounting one of them about the shank 14 and base 16 of the hitch ball 15 so that its disk 23 comes between the base 16 and the drawbar 10. In this position it is properly arranged to cooperate with the threads 21 of the cover 18 and hold it in position thereon as shown in Figs. 3 and 4 when the trailer hitch is not mounted thereon. In this position, the cover 18 acts to protect the hitch ball 15 and prevent the grease thereon from being rubbed off thus preventing the hitch ball 15 from becoming rusty and simultaneously serves to protect the clothing of anyone who is opening the trunk of the automobile from which the drawbar 10 extends. The second adapter 23 is mounted on the threaded shank 14 below the drawbar 10 and is secured thereon by means of the nut 17 being threaded over the shank 14 and holding the disk 23 of the adapter 22 firmly against the bottom of the drawbar. In this position, this lower adapter is arranged to receive the hitch ball cover 18 and store the same in handy position while leaving the hitch ball 15 exposed ready to receive the hitch of the trailer to be pulled by the drawbar 10. Then when the hitch of the trailer is disconnected and the trailer is parked, leaving the greasy hitch ball 15 exposed, the hitch ball cover 18 is removed from the lower position shown in Figs. 5 and 6 and mounted in the upper protecting position shown in Figs. 3 and 4.

There is thus provided a hitch ball cover which protects the hitch ball against rusting and deteriorating and simultaneously protects the user's clothing from becoming soiled or greasy while working in the neighborhood of the hitch ball and the drawbar as when putting things into or getting them out from the trunk of the automobile. Obviously the hitch ball cover 15 may be made of any suitable metal or plastic or other material which is capable of being threaded and is sufficiently rigid to cooperate with a holding thread. Obviously although complementary threads have been shown as the securing means between the adapter and the hitch ball cover, any other suitable securing means such as a friction fit or a bayonet joint or the like could also be used. Furthermore, if made of certain materials such as plastic materials including semi-rigid rubber, a friction fit could be relied on as the holding means rather than a thread or other fastening means.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

A hitch ball cover comprising a cup shaped member arranged to fit over a hitch ball, and a threaded adapter comprising an apertured flange disc arranged to be secured about the hitch ball shank between the hitch ball and the hitch drawbar, said cup shaped member having a complementary thread cooperating with the threaded adapter for removably securing the hitch ball cover thereon, and a second threaded adapter arranged to be secured below the hitch drawbar and a nut threaded on the hitch ball shank, said second adapter being arranged to receive and store the cover when the cover is not used in protective position over the hitch ball.

CLAIR L. BISHOP.

REFERENCES CITED

The following references are of record in the file of this patent:

UNITED STATES PATENTS

| Number | Name | Date |
| --- | --- | --- |
| 1,017,173 | Ryan | Feb. 13, 1912 |
| 2,512,222 | Brock | June 20, 1950 |
| 2,517,176 | Brock | Aug. 1, 1950 |